United States Patent [19]

Hedel

[11] 3,753,078

[45] Aug. 14, 1973

[54] FOLDBACK CURRENT CONTROL CIRCUIT
[75] Inventor: Kurt K. Hedel, Utica, N.Y.
[73] Assignee: General Electric Company, Utica, N.Y.
[22] Filed: May 3, 1972
[21] Appl. No.: 250,005

[52] U.S. Cl................ 323/9, 323/20, 323/22 T, 317/33 VR
[51] Int. Cl............................................. G05f 1/10
[58] Field of Search............... 323/4, 9, 20, 22 T; 317/33 VR, 31

[56] References Cited
UNITED STATES PATENTS
2,445,751  5/1969  Easter ............................. 323/9

Primary Examiner—J. D. Miller
Assistant Examiner—Harvey Fendelman
Attorney—Robert P. Cogan, Irving M. Freedman et al.

[57] ABSTRACT

In a foldback current control circuit, a sensing resistor is connected in series between a source and an output transistor. The sensing resistor biases the emitter of a first transistor of a matched pair included in a comparison circuit. The emitter of the second transistor of the pair is biased by a reference resistor which provides a reference voltage in response to load voltage. When a fault in the load circuit of the output transistor occurs, the reference voltage exceeds a threshold, and the potential at the collector of the second transistor exceeds that of the first in order to turn on a third transistor. The third transistor shunts base drive from the output transistor to prevent damage to the output transistor and load. Self-compensation of the circuit for temperature is achieved through use of the matched transistors in the comparison circuit and by maintaining nearly equal collector currents in the matched pair during an overload condition.

5 Claims, 5 Drawing Figures 3,753,078

FOLDBACK CURRENT CONTROL CIRCUIT

BACKGROUND OF THE INVENTION

This invention relates to current control circuits. More specifically, it relates to a foldback circuit for preventing an overcurrent condition.

A well-known form of overcurrent protection is the foldback circuit. The function of a foldback circuit is to decrease output current and hence output power in proportion to the severity of an overload condition. The foldback circuit derives its name from a curve representative of output voltage versus output current. Such a curve is generally a straight line for less than overload conditions. As overload severity increased, the curve "folds back" on itself. Prior foldback circuits utilize a sensing resistor, in series between an output transistor and a load, across which a control voltage is developed to turn on the base-emitter junction of a control transistor which modifies the bias on the output transistor. In such systems, the greater the degree of control to be provided, the greater the value of the resistor is to provide the needed control voltage. The sensing resistor produces a voltage drop which provides an output power loss and decreases efficiency of a power supply. In addition, the base-emitter turn-on voltage of the control transistor may vary with temperature, and such a circuit is not self-compensating for temperature variations.

SUMMARY OF THE INVENTION

It is, therefore, an object of the invention to provide a simple, accurate, temperature stable and reliable foldback current control circuit requiring less of a voltage drop across a sensing resistor with the same degree of control as provided in prior circuits.

It is also an object of the present invention to provide a foldback current control circuit which is more efficient than such prior circuits.

It is another object of the present invention to provide a foldback current control circuit of the type described in which balancing of two currents in a comparison circuit is utilized for self-compensation for variations in temperature.

It is a further object of the present invention to provide a foldback current control circuit of the type described which has a sharp cut-in characteristic.

It is another object of the present invention to provide a foldback current control circuit of the type described which may be incorporated in a voltage regulated power supply circuit without requiring an additional power supply voltage.

It is still another object of the present invention to provide a foldback current control circuit of the type described which utilizes a low power sensing resistor relative to the majority of prior foldback current control circuits, whereby the circuit lends itself to construction by microelectronic techniques.

It is also a further object of the present invention to provide a foldback current control circuit of the type described which will not "latch up".

It is yet a further object of one form of the present invention to provide a foldback current control circuit of the type described which will operate with a voltage regulator employing a common emitter output stage.

Briefly stated, in accordance with the present invention in one form, there is provided in a foldback current control circuit, a sensing resistor which is connected in series between a source and an output transistor. The sensing resistor is connected to bias the emitter of a first transistor of a matched pair included in a comparison circuit. The emitter of the second transistor of the pair is biased by a reference resistor which provides a reference voltage in response to load voltage. When a fault in the load circuit in the transistor circuit occurs, the reference voltage exceeds a threshold voltage, and the potential at the collector of the second transistor exceeds that of the first in order to turn on a third transistor. The third transistor shunts base drive from the output transistor to prevent damage to the output transistor and self-compensation of the circuit for temperature is achieved through the use of the matched transistors in the comparison circuit and by maintaining nearly equal collector currents in the matched pair during an overload condition.

BRIEF DESCRIPTION OF THE DRAWINGS

The foregoing objects and features of novelty which characterize the present invention are embodied in the circuitry pointed out with particularity in the claims forming the concluding portion of the specification. The invention, both as to its organization and manner of operation, may be further understood by reference to the following description taken in connection with the following drawings.

Of the drawings.

DESCRIPTION OF THE PREFERRED EMBODIMENT

Figure 1:
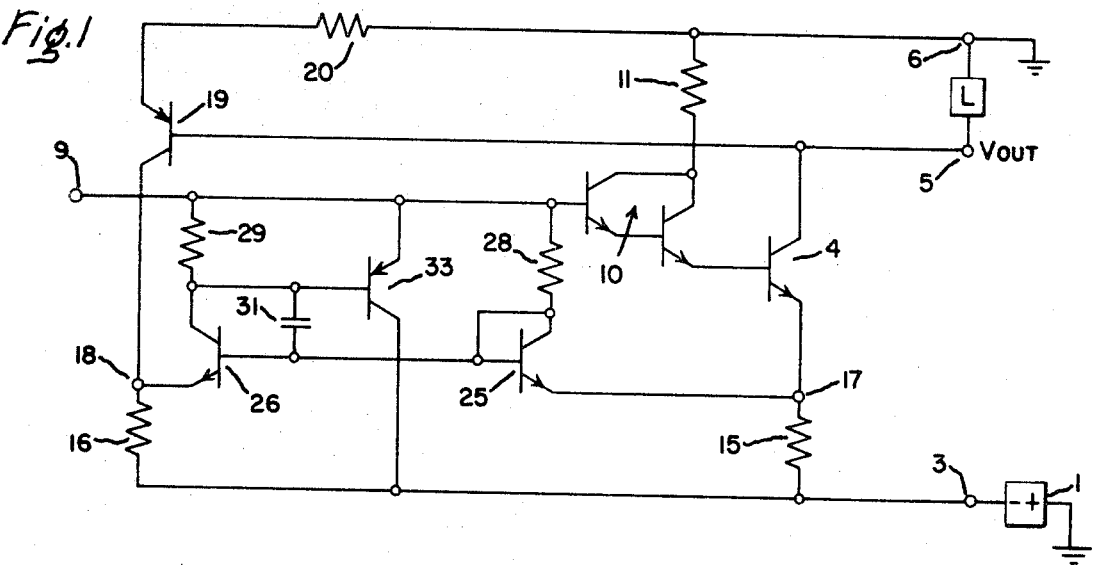
FIG. 1 is a schematic illustration of a foldback circuit constructed in accordance with the present invention.

FIG. 1 is a schematic illustration of a circuit constructed in accordance with the present invention for supplying power from a source 1 to a load L. The source 1 is connected to an input terminal 3 for coupling by an output transistor 4 to an output terminal 5. The output transistor 4 has its emitter-collector circuit coupled in series between the terminals 3 and 5. The load L is connected between the output terminal 5 and a level of reference potential, in the present embodiment ground potential, at a terminal 6.

The output transistor 4 has its collector connected to the terminal 5 and its emitter coupled to the terminal 3. By controlling the transistor 4 at its base, output voltage and current are determined. Base drive is provided to the output transistor 4 by control means for biasing the output transistor 4. In this embodiment the control means include a Darlington-connected bias transistor 10 having its emitter connected to the base of the transistor 4 and its collector coupled to the terminal 6 by a resistor 11. The resistor 11 limits the emitter current of the transistor 10. The base of the bias transistor 10 is coupled to a control voltage terminal 9 at which a voltage control potential may be applied from a prior art voltage control loop (not shown) and also by the circuitry of the present invention.

In accordance with the present invention a sensing resistor 15 is provided connected in series between the source 1 and output transistor 4. A first end of the sensing resistor 15 is connected to the terminal 3, and a second end of the sensing resistor 15 is connected to a terminal 17 at the emitter of the transistor 4. The circuit is operative to provide the foldback function when the voltage across the sensing resistor 15 rises above a threshold voltage. A reference voltage appears across a reference resistor 16 connected between the terminal 3 and a terminal 18. This reference voltage is responsive to load voltage. To this end, a transistor 19 is provided having its collector connected to the terminal 18 and its emitter connected to one end of a resistor 20, the other end of which is connected to the ground terminal 6. The base of the transistor 19 is connected to the output terminal 5.

A current balancing comparison circuit is provided including a pair of matched transistors 25 and 26 having their bases connected together and their emitters respectively coupled to the terminals 17 and 18. By a matched pair, it is meant that the transistors 25 and 26 have the same base-emitter voltage/base-emitter current characteristic. Other semiconductors could be used, but a matched pair of transistors most conveniently provide this desired characteristic. Further, the matched pair of transistors 25 and 26 is more susceptible to monolithic construction in an integrated circuit than are some other semiconductors. A first resistor 28 is connected in series between the collector of the transistor 25 and the base of the bias transistor 10, and a second resistor 29 is connected between the collector of the transistor 26 and the base of the bias transistor 10. The base of the transistor 25 is connected to the collector of the transistor 25. A control transistor 33 included in the aforementioned control means is provided to control the base drive of the bias transistor 10. The collector and emitter of the transistor 33 are respectively connected to the input terminal 3 and the base of bias the transistor 10. The base of the transistor 33 is connected to the collector of the transistor 26. A smoothing capacitor 21 is connected across the collector-base circuit of the transistor 26.

The value of the sensing resistor 15 is chosen to be small compared to that of the reference resistor 16. In a typical embodiment, the value of the sensing resistor 15 is 0.03 ohms and that of the reference resistor 16 is 100 ohms. The construction of the present invention thus provides for a transistor 15 which minimizes the voltage drop in series with the source 1. In addition, in the preferred embodiment the value of the resistor 28 is approximately twice that of the resistor 29.

OPERATION OF THE CIRCUIT

Figure 2:
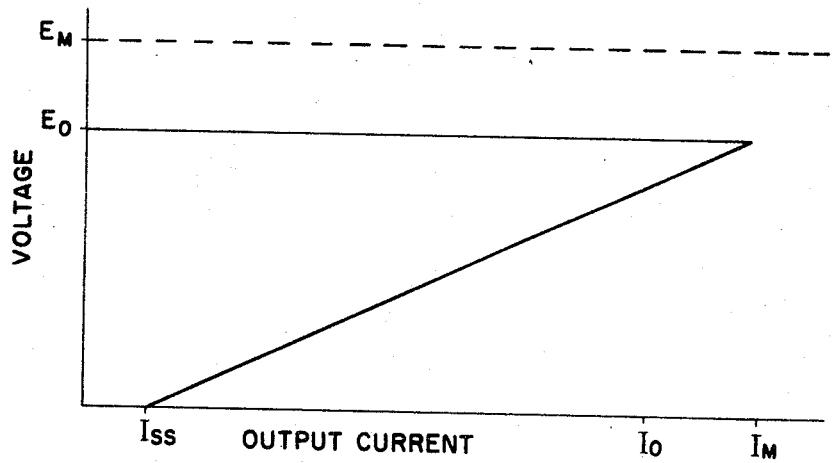
FIG. 2 is a graphic representation of the foldback characteristic of the circuit of FIG. 1.
Figure 3:
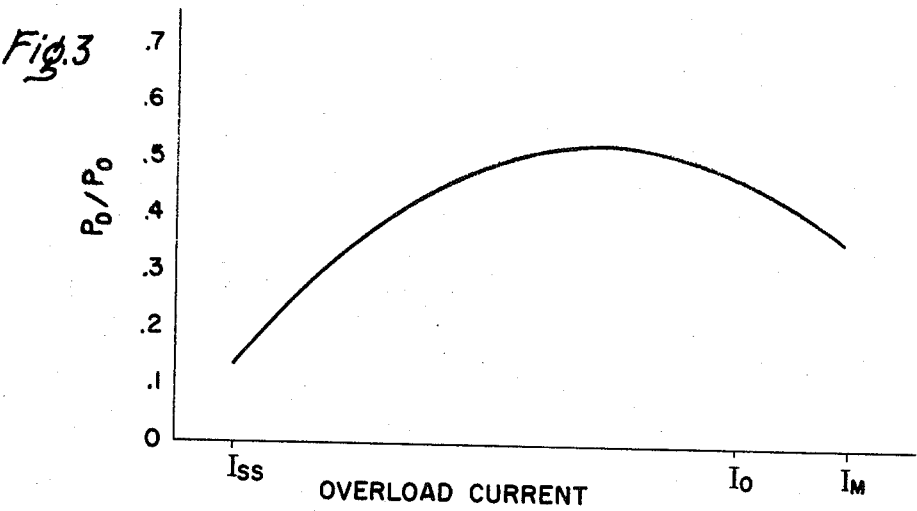
FIG. 3 is a graphic representation of power dissipation of the circuitry of FIG. 1 normalized with respect to maximum useable output power versus overload output current.

Operation of the circuit is discussed with respect to FIGS. 1, 2 and 3. FIG. 2 is a plot of output voltage at the terminal 5 versus output current supplied to the load L. FIG. 3 is a plot of power dissipation Po of the circuit of FIG. 1 normalized with respect to maximum useable output power Po versus overload output current.

For the present example, assume an application in which the maximum input voltage provided by the source 1 $E_M$, illustrated in FIG. 2, is 1.3 times the output voltage $E_O$ provided at the output terminal 5. $I_O$ is the normal output current, and $I_M$ is the maximum current provided before the circuit begins to perform the foldback function. $I_{SS}$ is the output current for a short circuit at the load L.

During normal operation, the voltage drop across the reference resistor 16 is greater than the voltage drop across the sensing resistor 15. The transistor 25 is conducting, the transistor 26 is nonconducting, and the transistor 33 is nonconducting. When the load current increases to $I_M$, the current through the resistor 15 increases to produce a voltage drop thereacross which is the aforementioned threshold voltage, so that the voltage at the terminal 17 is equal to the voltage at the terminal 18. The changing emitter voltage at the transistor 25 causes the base potential of the transistor 25 to turn on the transistor 26. When the voltage at the emitters, and hence the base-emitter voltages of the transistors 25 and 26, are equal, their collector currents are approximately equal since their bases are connected together and since they are a matched pair. In other words, the collector currents of the transistors 25 and 26 balance. Equal collector currents at the collectors of the transistors 25 and 26 produce different collector voltages and in the following manner. The voltage across the resistor 28 is equal to approximately two transistor base-emitter voltage drops. The path from the base of the bias transistor 10 to the terminal 17 includes the two base-emitter voltage drops of the Darlington-connected bias transistor 10 and the base-emitter voltage drop of the transistor 4. The resistor 28 and the base-emitter junction of the transistor 25 are connected in series across the aforementioned path. Therefore, the voltage across the resistor 28 is equal to the sum of the base-emitter voltage drops of the bias transistor 10 and output transistor 4 minus the base-emitter voltage drop of the transistor 25. Since, as stated above, in the preferred embodiment, the value of the resistor 29 is approximately one-half that of the resistor 28, the voltage drop across the resistor 29 is approximately one-half that of the resistor 28. The voltage drop across the resistor 29, therefore, may also be expressed as approximately one transistor base-emitter voltage drop.

When the overcurrent condition occurs, the voltage at the collector of the transistor 26 is sufficient to turn on the transistor 33 to shunt drive current from the transistor 10. In this manner, output current is reduced while there is a fault at the load L causing the overcurrent condition. Since a voltage at the collector of the transistor 26 which is a function of a base-emitter voltage drop is compared to another voltage which is a function of a base-emitter drop, i.e. the voltage across the resistor 28 which is applied to the base of the transistor 26, this comparison circuit is self-compensating for temperature. This self-compensation may also be explained from the viewpoint that temperature-induced changes in the collector currents of the transistor 25 and 26 balance each other.

The foldback circuit provides a given output current for a given overload condition. As overload increases, the current through and the reference voltage across the reference resistor 16 changes. The threshold voltage which the drop across the sensing resistor 15 must exceed to turn on the transistor 33 in turn changes. A given voltage across the sensing resistor 15 results in a given voltage at the collector of the transistor 26 to vary the degree by which the transistor 33 shunts drive current from the bias transistor 10 and the output transistor 4. Consequently, the output current varies with severity of overload condition as illustrated in FIG. 2 on the portion of the curve from $I_M$ to $I_{SS}$. $I_{SS}$ is the worst case, being indicitive of a short circuit at the load L. Complete shutdown of the circuit is prevented by the emitter current of the transistor 26 flowing through the resistor 16. This current path prevents latch up. In other words, once the fault at the load L is cleared, normal operation resumes.

As seen in FIG. 3, when a fault condition occurs at the load L, output power is reduced. The ordinate of FIG. 3 is the ratio of the circuit power dissipation occurring mainly in transistor 4 for a given overcurrent condition at the load L, as indicated by the abscissa, to the maximum useable output power the circuit is capable of providing. FIG. 3 thus demonstrates that the circuit prevents itself from damage due to too much current being drawn through the output transistor 4. Further, due to the characteristic illustrated in FIG. 3, internal power dissipation is minimized, and the danger of the circuit's overheating due to too much power being drawn therefrom is eliminated.

It should be noted that the transistor 25 could be replaced by a different semiconductor. The transistor 25 is shown here since it is most convenient to match the characteristics of a transistor 25 rather than another semiconductor to those of the transistor 26.

Figure 4:
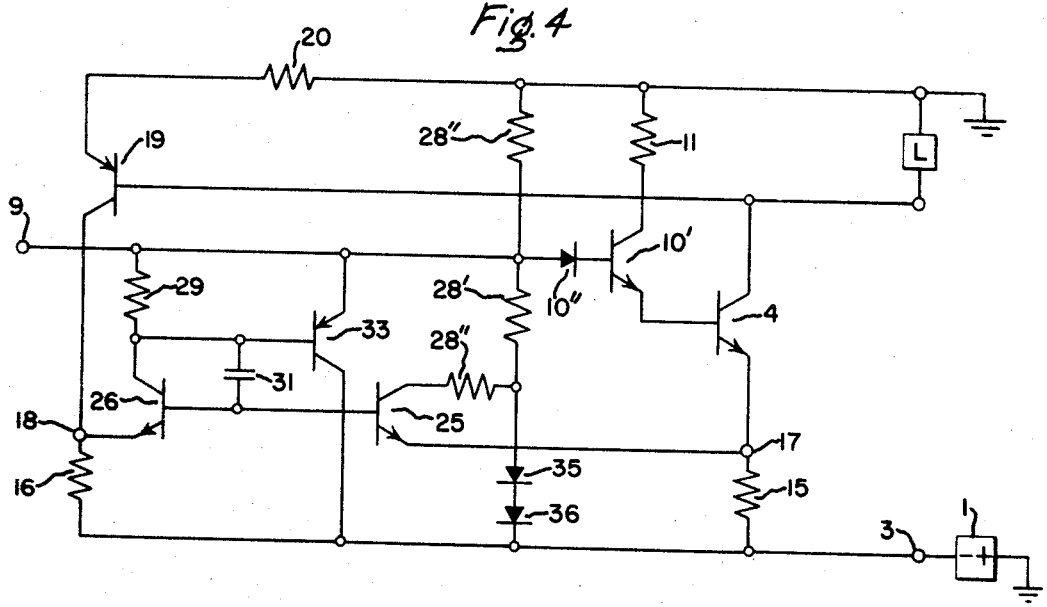
FIGS. 4 and 5 are schematic illustrations of further embodiments of the present invention.

The bias applied to the base of the output transistor 4 is responsive to the voltage drop between the base of the output transistor 4 and the control voltage terminal 9. Therefore, an "offset" voltage must be maintained therebetween. In the circuit of FIG. 1, the offset voltage is provided by the base-emitter voltage drops of the Darlington bias transistor 10. However, other ways may be used to provide the offset voltage. One example is shown in FIG. 4, in which the same reference numerals are used to denote components corresponding to those of FIG. 1. In the circuit of FIG. 4, the bias transistor 10 is replaced by a conventional transistor 10' connected in series with a diode 10''. The diode 10'' may be a conventional diode or a zener diode or other form of diode suitable for maintaining the offset voltage. In the embodiment of FIG. 4, the cathode of the diode 10'' is connected to the base of the transistor 10' for conduction in a forward direction. A resistor 28' is connected in series with further offset diodes 35 and 36 between the cathode of the diode 10'' and the input terminal 3. A resistor 28'' is connected from the collector of the transistor 25 and the lower terminal of the transistor 28' for limiting collector current of the transistor 25. In this embodiment, the diodes 35 and 36 provide the voltage drop across the output transistor 4 and semiconductors 10' and 10'' rather than the base-emitter drop of the transistor 25 as in the circuit of FIG. 1.

Figure 5:
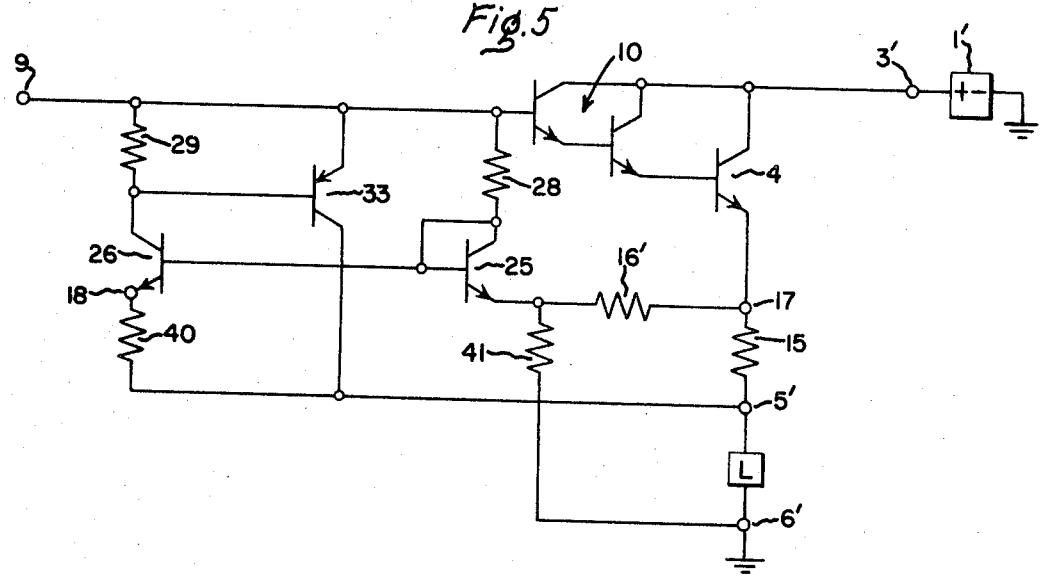

In FIG. 5, the same reference numerals are again utilized to denote elements corresponding to those of FIG. 1. In the circuit of FIG. 5, the positions of the load L and the source 1 are reversed. In other words, the source 1 is coupled to an input terminal 3' connected to the collector of the output transistor 4. The load L is coupled between an output terminal 5' connected to the lower end of the sensing resistor 15 and a ground terminal 6'. A biasing resistor 40 is connected between the emitter of the transistor 26 and the output terminal 5'. In this embodiment, a reference resistor 16' is connected between the terminal 17 and the emitter of the transistor 25. A bias resistor 41 is connected between the emitter of the transistor 25 and the ground terminal 6'. In this embodiment, the output transistor 4 operates in the common collector mode.

In this embodiment, the sensing resistor 15 senses output voltage as in the embodiment of FIG. 1. The voltage drop across the bias resistor 41 is responsive to output voltage. Consequently, the voltage drop across the reference resistor 16' is responsive to load voltage. The voltage drops across the sensing resistor 15 and the reference resistor 16' are of opposite polarities with respect to the collector of the transistor 25. When a fault occurs at the load L, the voltage drop across the reference resistor 16' increases to a value greater than that across the sensing resistor 15 in order to exceed the threshold voltage and initiate foldback operation.

In each embodiment, it is desirable that the bias transistor 10 have a high value of beta, or current gain. A high current increases the sharpness of the cutting-in characteristic, i.e. ideal operation precisely in accordance with FIG. 2, and improves the current balance over the entire foldback characteristic.

What is thus provided is a foldback current control circuit in which the voltage across the sensing resistor connected in series with an output transistor is compared to a reference voltage which reference voltage is responsive to load voltage by a comparison circuit controlling base drive to the output transistor. Different forms in the invention have been illustrated to enable those skilled in the art to make many modifications in accordance with the present invention.

What is claimed as new and desired to be secured by Letters Patent of the United States is:

1. A foldback current control circuit comprising, in combination:
   a. an output transistor having a collector output for connection between a source and a load;
   b. a sensing resistor connected in series with the emitter of said output transistor;
   c. a bias transistor coupled for biasing said output transistor;
   d. a control transistor for controlling bias of said biasing transistor;
   e. a reference resistor coupled to provide a voltage drop responsive to the voltage across the load; and
   f. a current balancing comparison circuit including first and second semiconductors connected for current balancing said second semiconductor being coupled to bias said control transistor, and said first and second semiconductors being respectively coupled to compare the voltage across said sensing resistor and said reference resistor, and said first semiconductor being coupled to provide a current responsive to the voltage across said sensing resistor, the values of the components of said comparison circuit being chosen such that the voltage across said sensing resistor increases above a threshold voltage determined by the value of said reference resistor in response to an overcurrent condition at the load, whereby biasing of said control transistor by said second semiconductor is responsive to an overcurrent condition at the load.

2. A current control circuit according to claim 1 in which said comparison circuit comprises first and second tranistors having their bases connected together and their emitters respectively connected to said sensing resistor and said reference resistor, the collector of said first transistor being connected to the base of said first transistor, said comparison circuit further including first and second resistors respectively connected between the collectors of said first and second transistors and the base of said biasing transistor.

3. A control circuit according to claim 2 in which said first and second transistors comprise a matched pair, such that said first and second transistors have the same temperature coefficient, whereby the comparison of the collector voltage of said second transistor to the voltage across said first resistor is self compensating for temperature.

4. A foldback current control circuit according to claim 2 in which said bias transistor is connected having its emitter-collector circuit connected coupled from the base of said output transistor across the source and having its base connected to said control transistor.

5. A foldback current control circuit according to claim 4 including means for making said reference resistor responsive to low voltage comprising a transistor having its emitter-base circuit being connected across the load and its collector connected to a first end of said reference resistor, the other end of said reference resistor being connected to the source.

* * * * *